(12) United States Patent
Zhao et al.

(10) Patent No.: US 11,442,343 B2
(45) Date of Patent: *Sep. 13, 2022

(54) GIMBAL LOAD MOUNTING ASSEMBLY, GIMBAL, AND IMAGING DEVICE

(71) Applicant: SZ DJI OSMO TECHNOLOGY CO., LTD., Shenzhen (CN)

(72) Inventors: Yanchong Zhao, Shenzhen (CN); Guoyao Liu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 223 days.

This patent is subject to a terminal disclaimer.

(21) Appl. No.: 16/454,672

(22) Filed: Jun. 27, 2019

(65) Prior Publication Data

US 2019/0317386 A1 Oct. 17, 2019

Related U.S. Application Data

(63) Continuation of application No. PCT/CN2016/112804, filed on Dec. 28, 2016.

(51) Int. Cl.
*F16M 11/18* (2006.01)
*G03B 17/56* (2021.01)
(Continued)

(52) U.S. Cl.
CPC .......... *G03B 17/561* (2013.01); *F16M 11/10* (2013.01); *F16M 11/18* (2013.01); *F16M 11/205* (2013.01)

(58) Field of Classification Search
CPC ...... G03B 17/561; F16M 11/10; F16M 11/18; F16M 11/205
USPC .... 248/274.1, 661, 913, 660, 583, 485, 487, 248/489, 278.1; 396/428, 12, 13; 74/490.1, 490.3, 5 R, 5.1, 5.8, 5.9; 359/871–874, 876
See application file for complete search history.

(56) References Cited

U.S. PATENT DOCUMENTS 4,796,846 A 1/1989 Meier et al.
6,068,223 A * 5/2000 Navarro ................. F16M 11/14
224/265

(Continued)

FOREIGN PATENT DOCUMENTS

CN 2178969 Y 10/1994
CN 201487489 U 5/2010
(Continued)

OTHER PUBLICATIONS

World Intellectual Property Organization (WIPO) International Search Report for PCT/CN2016/112804 dated Oct. 10, 2017 5 pages.

*Primary Examiner* — Eret C McNichols
*Assistant Examiner* — Michael McDuffie
(74) *Attorney, Agent, or Firm* — Anova Law Group, PLLC

(57) ABSTRACT

A gimbal load mounting assembly includes a first seating body, a second seating body configured to slidably connect with the first seating body, and a fastener. The first seating body is configured to connect with a gimbal frame and slide in a first direction. The second seating body is configured to mount a load and is slidable on the first seating body in a second direction. The fastener is configured to connect with the first seating body and to lock a mounting location of the first seating body relative to the gimbal frame and a mounting location of the second seating body relative to the first seating body.

20 Claims, 5 Drawing Sheets

(51) Int. Cl.
*F16M 11/10* (2006.01)
*F16M 11/20* (2006.01)

(56) References Cited

U.S. PATENT DOCUMENTS

| | | | | |
|---|---|---|---|---|
| 6,196,504 | B1 * | 3/2001 | Lemke | F16M 11/041 248/187.1 |
| 8,783,973 | B2 * | 7/2014 | Pizzo | F16M 11/048 396/420 |
| 10,136,038 | B2 * | 11/2018 | Pan | G03B 17/563 |
| 2004/0223078 | A1 | 11/2004 | Zadok | |
| 2005/0041966 | A1 * | 2/2005 | Johnson | F16M 11/041 396/428 |
| 2014/0161434 | A1 * | 6/2014 | Koymen | F16M 11/043 396/428 |
| 2015/0185591 | A1 * | 7/2015 | Jorgenson | G03B 17/561 396/428 |
| 2015/0308618 | A1 * | 10/2015 | Valero | F16M 11/2071 700/213 |
| 2016/0305602 | A1 * | 10/2016 | Carthey | F16M 11/18 |
| 2016/0360096 | A1 | 12/2016 | Holmes | |
| 2017/0099416 | A1 * | 4/2017 | Pan | F16M 11/18 |
| 2017/0108161 | A1 * | 4/2017 | Zhao | G03B 17/561 |
| 2017/0108168 | A1 * | 4/2017 | Pan | F16M 11/16 |
| 2017/0115551 | A1 * | 4/2017 | Pan | F16M 13/04 |
| 2017/0131623 | A1 * | 5/2017 | Zhou | F16M 11/2092 |
| 2017/0227834 | A1 * | 8/2017 | Zhao | G03B 17/561 |
| 2017/0261157 | A1 * | 9/2017 | Guo | F16M 11/205 |
| 2017/0301230 | A1 * | 10/2017 | Liu | G03B 17/563 |
| 2018/0106425 | A1 * | 4/2018 | Brown | F16M 13/00 |
| 2018/0299752 | A1 * | 10/2018 | Zhao | F16M 11/18 |
| 2018/0335178 | A1 * | 11/2018 | Bin | F16M 11/123 |
| 2019/0301664 | A1 * | 10/2019 | Zhao | F16M 11/205 |
| 2019/0302578 | A1 * | 10/2019 | Zhao | F16M 11/18 |
| 2019/0316731 | A1 * | 10/2019 | Zhao | F16M 11/24 |
| 2019/0317385 | A1 * | 10/2019 | Zhao | F16M 13/00 |

FOREIGN PATENT DOCUMENTS

| | | |
|---|---|---|
| CN | 203384588 U | 1/2014 |
| CN | 203907156 U | 10/2014 |
| CN | 203963419 U | 11/2014 |
| CN | 204062364 U | 12/2014 |
| CN | 107002939 A | 8/2017 |
| DE | 202005001542 U1 | 3/2005 |
| DE | 102012018755 A1 | 3/2014 |
| JP | 2014023075 A | 2/2014 |
| PL | 411670 A1 | 9/2016 |
| SU | 996787 A1 | 2/1983 |
| WO | 2015022433 A1 | 2/2015 |
| WO | 2015196484 A1 | 12/2015 |
| WO | 2016023192 A1 | 2/2016 |

* cited by examiner

GIMBAL LOAD MOUNTING ASSEMBLY, GIMBAL, AND IMAGING DEVICE

CROSS-REFERENCE TO RELATED APPLICATION

This application is a continuation application of International Application No. PCT/CN2016/112804, filed on Dec. 28, 2016, the entire content of which is incorporated herein by reference.

TECHNICAL FIELD

The present disclosure relates to the technical field of imaging and, more particularly, to a gimbal load mounting assembly, and a gimbal having the gimbal load mounting assembly, and an imaging device.

BACKGROUND

When cameras, camcorders, or sensors and other devices that obtain external information, signal, or data are mounted on a gimbal, the gimbal can stabilize such loads. For example, a gimbal may realize stable imaging and imaging angle adjustment for a camera. The gimbal may cause the camera to move in at least one rotation direction. The gimbal may include a driving motor that can cause a rotation in the rotation direction. When connected to the gimbal, the center of gravity of the camera has to fall on a rotation axis of the rotation direction to avoid the driving motor experiencing an unexpected torque, which may affect the user experience of imaging and the operational life time of the gimbal. Therefore, it is desirable to real time adjust the center of gravity of the camera. In the meantime, how to quickly and conveniently fix the relative location of the camera after the center of gravity adjustment has become an emerging issue to be addressed.

SUMMARY

In accordance with the present disclosure, there is provided a gimbal load mounting assembly including a first seating body, a second seating body configured to slidably connect with the first seating body, and a fastener. The first seating body is configured to connect with a gimbal frame and slide in a first direction. The second seating body is configured to mount a load and is slidable on the first seating body in a second direction. The fastener is configured to connect with the first seating body and to lock a mounting location of the first seating body relative to the gimbal frame and a mounting location of the second seating body relative to the first seating body.

In accordance with the present disclosure, there is provided a gimbal including a frame, a motor assembly configured to drive the frame to rotate, and a gimbal load mounting assembly provided on the frame. The gimbal load mounting assembly includes a first seating body, a second seating body configured to slidably connect with the first seating body, and a fastener. The first seating body is configured to connect with a gimbal frame and slide in a first direction. The second seating body is configured to mount a load and is slidable on the first seating body in a second direction. The fastener is configured to connect with the first seating body and to lock a mounting location of the first seating body relative to the gimbal frame and a mounting location of the second seating body relative to the first seating body.

In accordance with the present disclosure, there is provided an imaging device. The imaging device includes a gimbal and an imaging assembly mounted to the gimbal. The gimbal includes a frame and a gimbal load mounting assembly. The gimbal load mounting assembly includes a first seating body, a second seating body configured to slidably connect with the first seating body, and a fastener. The first seating body is configured to connect with a gimbal frame and slide in a first direction. The second seating body is configured to mount a load and is slidable on the first seating body in a second direction. The fastener is configured to connect with the first seating body and to lock a mounting location of the first seating body relative to the gimbal frame and a mounting location of the second seating body relative to the first seating body.

Compared to conventional technologies, the gimbal load mounting assembly uses a single fastener to simultaneously lock the mounting location of the first seating body relative to the frame and the mounting location of the second seating body relative to the first seating body. The operations are simple and fast.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

Figure 1:
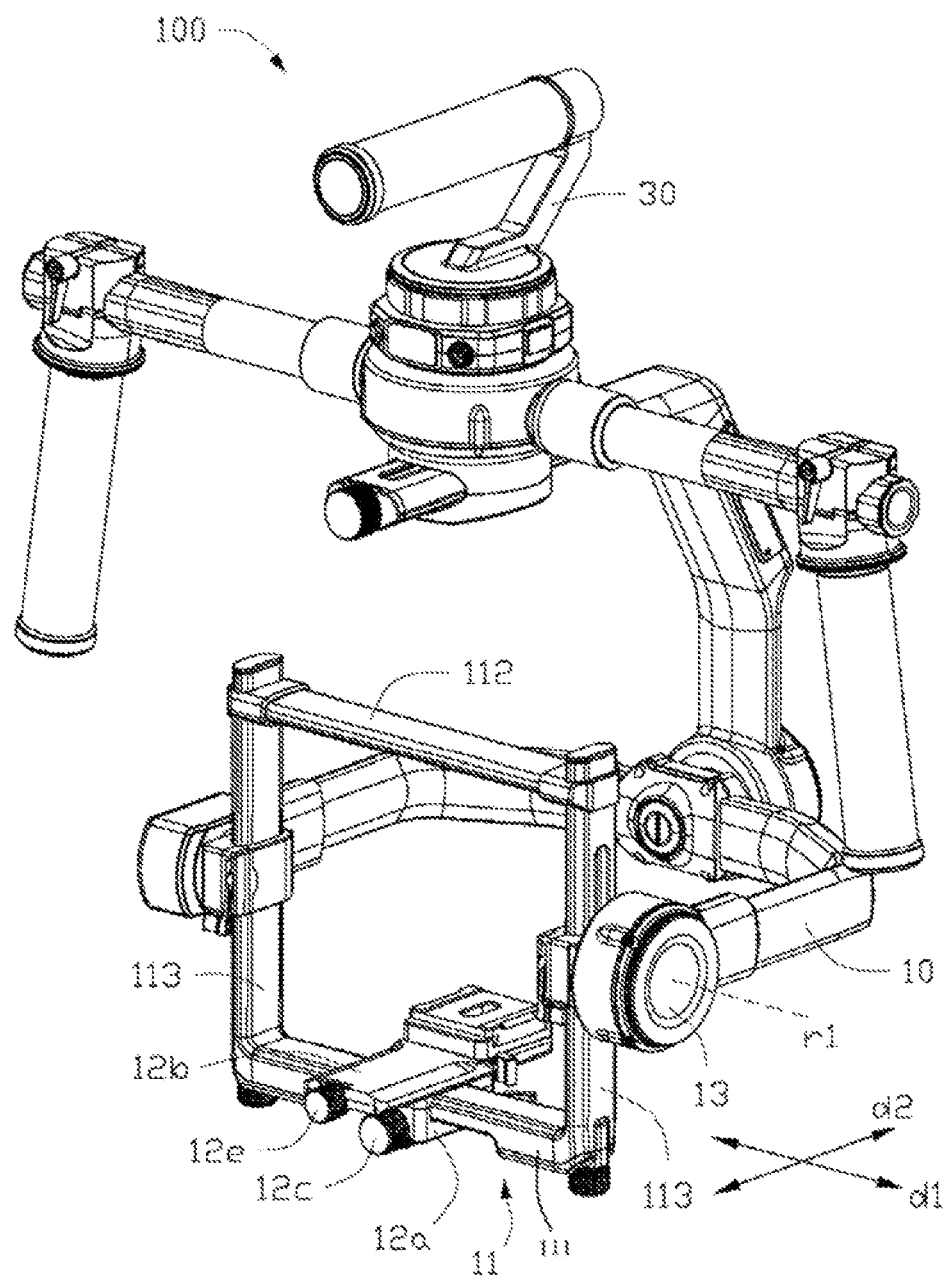
FIG. 1 is a perspective view of an imaging device according to an example embodiment of the present disclosure.

| Major Elements Reference Description | |
|---|---|
| Imaging device | 100 |
| Gimbal | 10 |
| Frame | 11 |
| First horizontal frame | 111 |
| Guiding segment | 1111 |
| Groove | 1112 |
| Blocking wall | 1113 |
| Tooth strip | 1114 |
| Second horizontal frame | 112 |
| Vertical frame | 113 |
| Mounting assembly | 12 |
| First seating body | 12a |
| First joining member | 121 |
| First groove | 121a |
| First mounting member | 1211 |
| Second mounting member | 1212 |
| First through hole | 1214 |
| First fitting groove | 1215 |
| Second through hole | 1216 |
| Second fitting groove | 1217 |
| Matching depression | 1218 |

| Major Elements Reference Description | |
|---|---|
| Second joining member | 122 |
| Second groove | 122a |
| Receiving groove | 122b |
| Mounting hole | 122c |
| Top surface | 1221 |
| Bottom surface | 1222 |
| First side surface | 1223 |
| Second side surface | 1224 |
| First end surface | 1225 |
| Second end surface | 1226 |
| First guiding member | 1227 |
| Protruding rib | 1228 |
| Second seating body | 12b |
| Movable member | 123 |
| Depressed opening | 123a |
| Top surface | 1231 |
| Bottom surface | 1232 |
| First end surface | 1233 |
| Second end surface | 1234 |
| Second guiding member | 1235 |
| Load bearing member | 1236 |
| Axis hole | 1236a |
| First mounting structure | 1237 |
| Connecting hole | 1237a |
| Second mounting structure | 1238 |
| First assembly hole | 1238a |
| Shaft connecting hole | 1238b |
| Groove | 1238c |
| Fixing hole | 1238d |
| Positioning pin | 1238e |
| Connecting member | 124 |
| Fixing member | 1241 |
| Second assembly hole | 1241a |
| Positioning hole | 1241b |
| Guiding block | 1241c |
| Blocking member | 1241d |
| Though hole | 1241e |
| Receiving depression | 1241f |
| Snap-in member | 1241g |
| Slidable member | 1242 |
| Snap-fit groove | 1242a |
| Connecting structure | 1242b |
| Locking member | 1243 |
| Slidable part | 1243a |
| Driving member | 1243b |
| Bottom plate | 1243c |
| Locking block | 1243d |
| First side edge | 1243e |
| Second side edge | 1243f |
| End wall | 1243g |
| Opening | 1243h |
| Snap-in member | 1243i |
| Abutting depression | 1243j |
| Rotating disk | 1243k |
| Protruding wheel | 1243l |
| Operating member | 1243m |
| Rotating shaft | 1243n |
| First adjusting member | 12c |
| First knob | 1251 |
| First driving member | 1252 |
| Rotating shaft | 1253 |
| Pin hole | 1253a |
| Bearing | 1254 |
| Shaft hole | 1254a |
| Fastener | 12d |
| First abutting member | 1261 |
| First abutting surface | 1261a |
| First slant surface | 1261b |
| Bottom surface | 1261c |
| Avoidance member | 1261d |
| Driving member | 1262 |
| Stud segment | 1262a |
| Connecting segment | 1262b |
| Abutting-pressing member | 1262c |
| Pressing block | 1262d |
| First surface | 1262e |
| Second surface | 1262f |

| Major Elements Reference Description | |
|---|---|
| Second slant surface | 1262g |
| Depression | 1262h |
| Through hole | 1262i |
| Handle | 1263 |
| Sleeve-fitting member | 1263a |
| Handle member | 1263b |
| Cap member | 1263c |
| Protruding rib | 1263d |
| Groove | 1263e |
| Second abutting member | 1264 |
| Second abutting surface | 1264a |
| Fitting surface | 1264b |
| Fitting hole | 1264c |
| Second adjusting member | 12e |
| Second knob | 1271 |
| Second driving member | 1272 |
| First connecting end | 1272a |
| Second connecting end | 1272b |
| Blocking cover | 129 |
| Motor | 13 |
| Load | 20 |
| Handheld structure | 30 |
| Counterweight assembly | 40 |

The following detailed embodiments will be combined with the above accompanying drawings to further explain the present disclosure.

DETAILED DESCRIPTION OF THE EMBODIMENTS

Technical solutions of the embodiments of the present disclosure will be described in detail with reference to the drawings of the embodiments. It is understood that the described embodiments represent some, rather than all, of the embodiments of the present disclosure. Other embodiments conceived or derived by those having ordinary skills in the art based on the described embodiments without inventive efforts should fall within the scope of the present disclosure.

It is noted that when a component is described as being "fixed to" another component, the component may be directly fixed to the other component, or there may be another intermediate component. When a component is described as being "connected" with another component, the component may be directly connected with the other component or it is possible to have an intermediate component. When a component is described as being "provided" at another component, the component may be directly provided at the other component or it is possible to have an intermediate component. The terms "perpendicular," "horizontal," "left," "right," and similar expressions used herein are merely intended for description purpose.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any and all suitable combinations of one or more related items listed.

Figure 2:
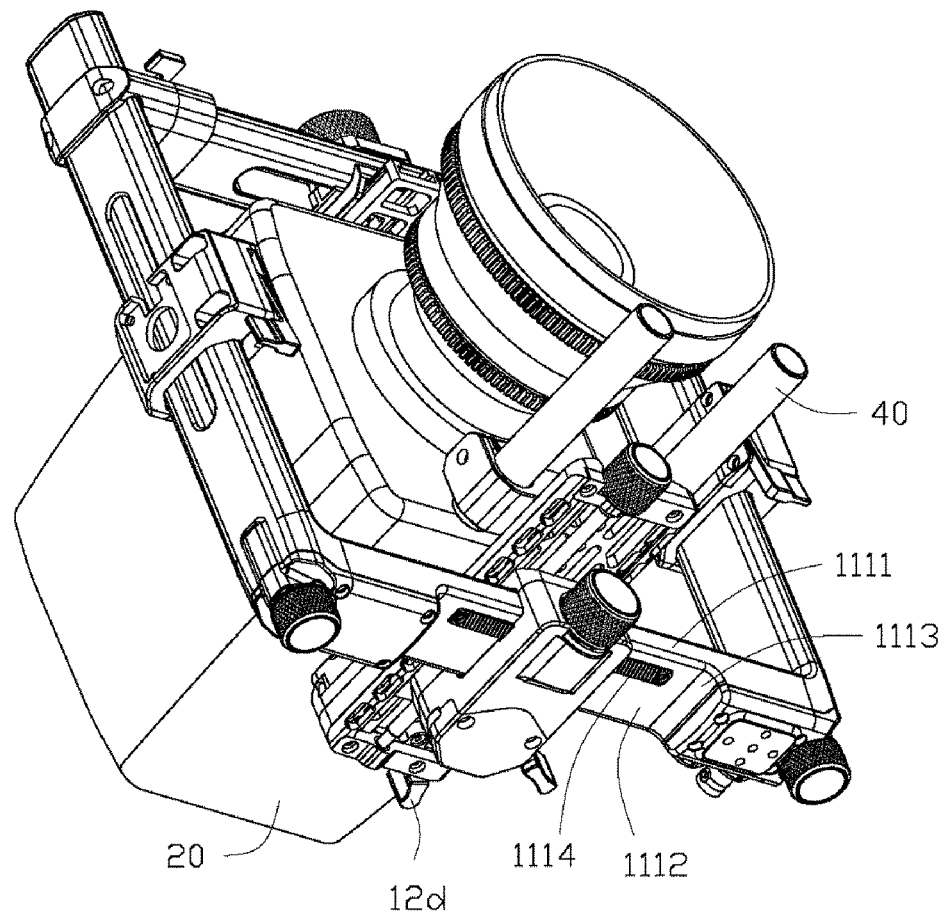
FIG. 2 is a perspective view of a frame of the imaging device of FIG. 1, according to an example embodiment.

Referring to FIG. 1 and FIG. 2, an imaging device 100 of an embodiment of the present disclosure includes a gimbal 10 and a load 20 provided on the gimbal 10. The gimbal 10 may be configured to stabilize the load 20 and to change a facing direction and an angle of the load 20. In some embodiments, the load 20 may include a camera configured to capture videos and/or photos (images). Specifically, the camera may include a single-lens reflex ("SLR") camera, a camcorder, a compact camera, a surveillance camera, or an electronic device having imaging functions (e.g., a cell phone, a tablet, etc.).

The gimbal 10 may be a three-axis gimbal, a two-axis gimbal, or a single-axis gimbal. In this embodiment, the gimbal 10 is a three-axis gimbal. The gimbal 10 may include a frame and a motor configured to drive the frame to rotate. The frame may bear the load 20 and may be driven by the motor to cause the load 20 to rotate around an axis of the gimbal. The numbers of the motors and the frames may be different when the axes of the gimbal are different. Next, detailed descriptions and explanations are provided primarily with regard to a frame 11 having a mounting assembly 12. In some embodiments, the frame 11 may bear the load 20 through the mounting assembly 12 and may be driven by a corresponding motor 13 to rotate around a rotation axis. In the embodiments shown in the figures, the frame 11 may rotate around an axis r1. Specifically, the axis r1 may be a pitch axis of the gimbal 10. It is understood that gimbal 10 may include frames (not shown) rotating around other axes (e.g., a roll axis, a yaw axis) and motors for driving such frames, which are not described in detail.

In the embodiments shown in the figures, the gimbal 10 may be connected with a handheld structure 30. The imaging device 100 may be a handheld imaging device. It is understood that the gimbal 10 may be connected with a movable object (e.g., unmanned aircraft, unmanned vehicle, etc.), to form a movable imaging device (e.g., an aerial photographing device, a ground based movable imaging device).

In the embodiments shown in the figures, the frame 11 may include a substantially rectangular frame shape, and may include a first horizontal frame 111, a second horizontal frame 112, and two vertical frames 113. The first horizontal frame 111 may be disposed substantially in parallel with the second horizontal frame 112. The two vertical frames 113 may be disposed substantially in parallel. The first horizontal frame 111, the second horizontal frame 112 may be substantially perpendicular to the vertical frames 113.

When the imaging device 100 is placed normally, the first horizontal frame 111 may be located at a lower position (in a direction closer to the ground), and the second horizontal frame 112 may be located at an upper position (in a direction away from the ground).

The first horizontal frame 111 may have a substantially longitudinal strip shape. The first horizontal frame 111 may be provided with a guiding segment 1111. The guiding segment 1111 may couple with the mounting assembly 12 and may guide the travel of the mounting assembly 12. The first horizontal frame 111 may be provided with a groove 1112 at a lower portion of the guiding segment 1111. The first horizontal frame 111 may include blocking walls 1113 formed at two ends of the groove 1112. The blocking walls 1113 may be configured to limit a movement location of the mounting assembly 12 relative to the first horizontal frame 111.

In some embodiments, the guiding segment 1111 may be provided with a tooth strip 1114. The length direction of the tooth strip 1114 may be substantially parallel with the length direction of the guiding segment 1111. More specifically, the teeth of the tooth strip 1114 may be slantly disposed relative to the length direction of the tooth strip 1114. The tooth strip 1114 may be integrally formed with the guiding segment 1111 or may be separately formed and fixedly connected with the guiding segment 1111.

The mounting assembly 12 may include a first seating body 12a, a second seating body 12b, a first adjusting member 12c, a fastener 12d, and a second adjusting member 12e. The first seating body 12a may be provided on the first horizontal frame 111 and may be configured to be slidable along the first horizontal frame 111 in a first direction d1. The second seating body 12b may be provided on the first seating body 12a and may be configured to be slidable along the first seating body 12a in a second direction d2. The first direction d1 and the second direction d2 may be different and may cross each other at a predetermined angel. In some embodiments, the first direction d1 may be substantially in parallel with the second direction d2. In the embodiments shown in the figures, the first direction d1 may be substantially in parallel with the pitch axis of the gimbal, and the second direction d2 may be in parallel with the roll axis of the gimbal. The first adjusting member 12c and the fastener 12d may be provided at the first seating body 12a. The first adjusting member 12c may be configured to drive the first seating body 12a to move in the first direction d1. The fastener 12d may lock a location of the first seating body 12a relative to the first horizontal frame 111 and a location of the second seating body 12b relative to the first seating body 12a, such that the first seating body 12a cannot move relative to the first horizontal frame 111 and the second seating body 12b cannot move relative to the first seating body 12a. The second adjusting member 12e may be provided at the second seating body 12b. The second adjusting member 12e may be configured to drive the second seating body 12b to move in the second direction d2.

Figure 3:
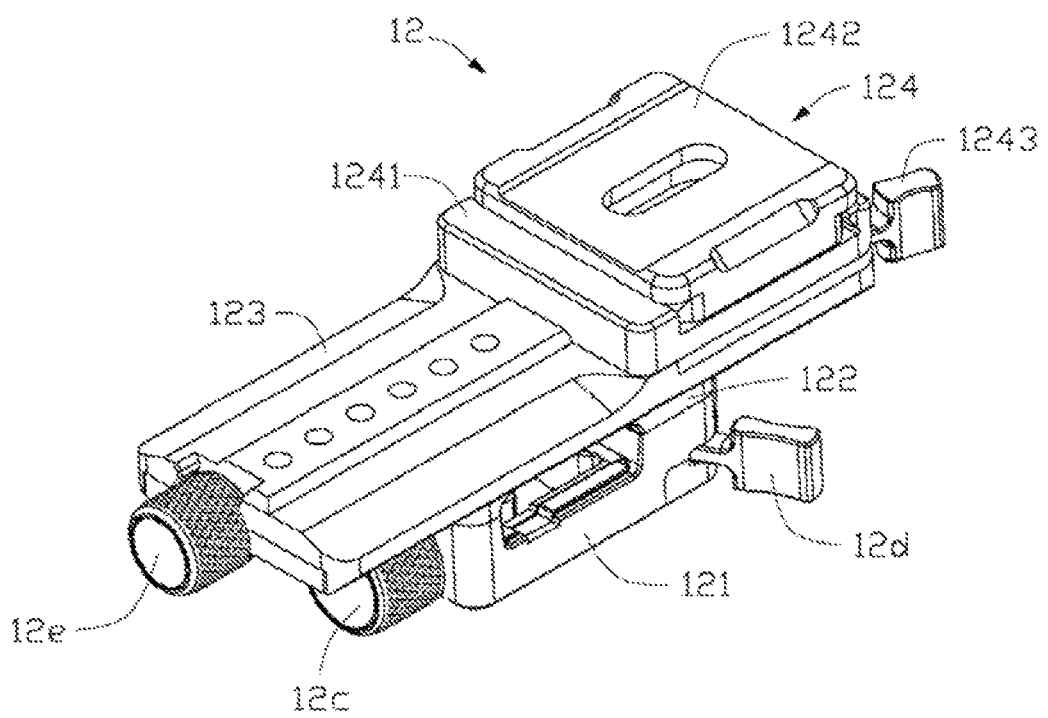
FIG. 3 is a perspective view of a mounting assembly of the imaging device of FIG. 1, according to an example embodiment.
Figure 4:
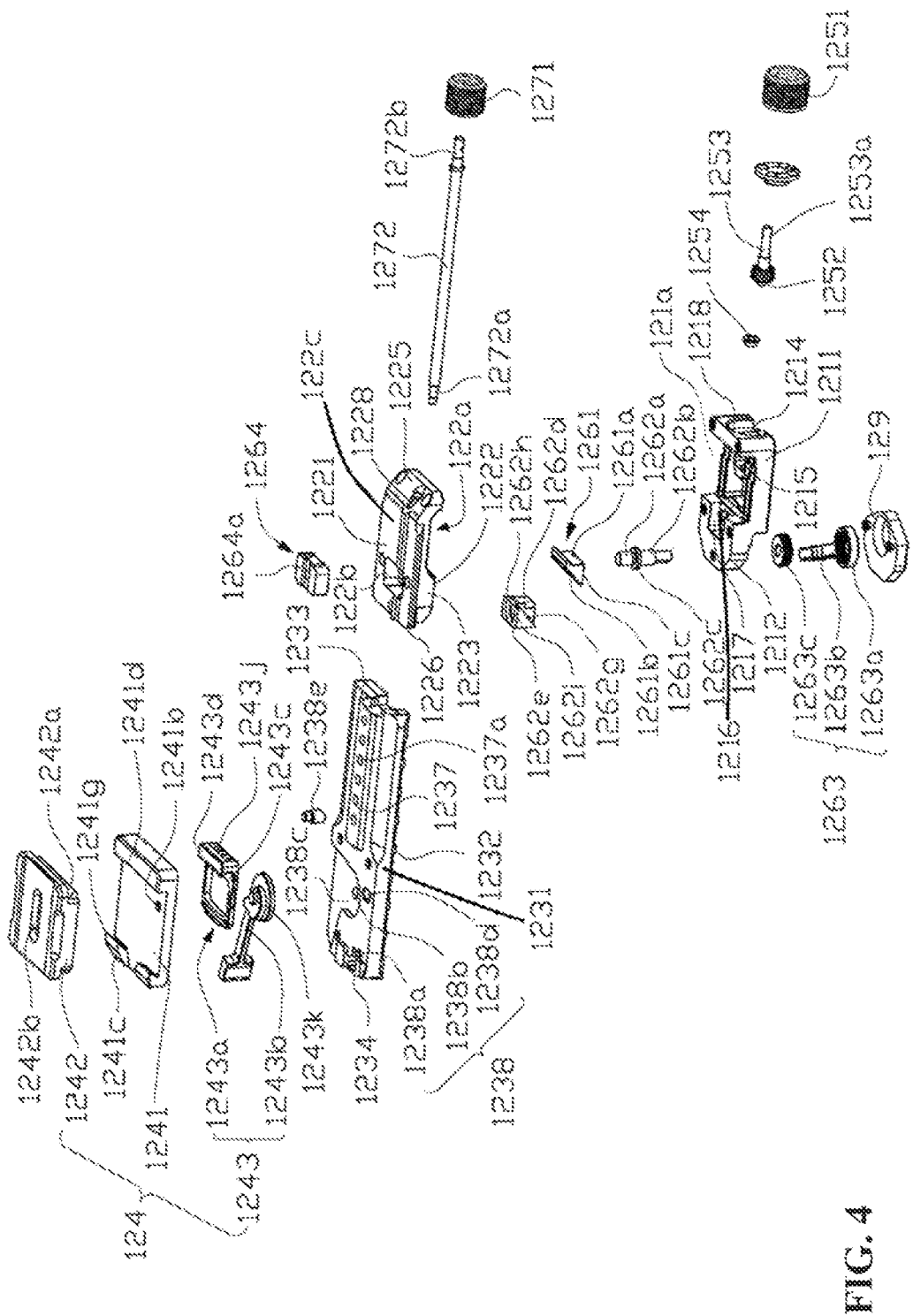
FIG. 4 is an exploded view of the mounting assembly of FIG. 3, according to an example embodiment.
Figure 5:
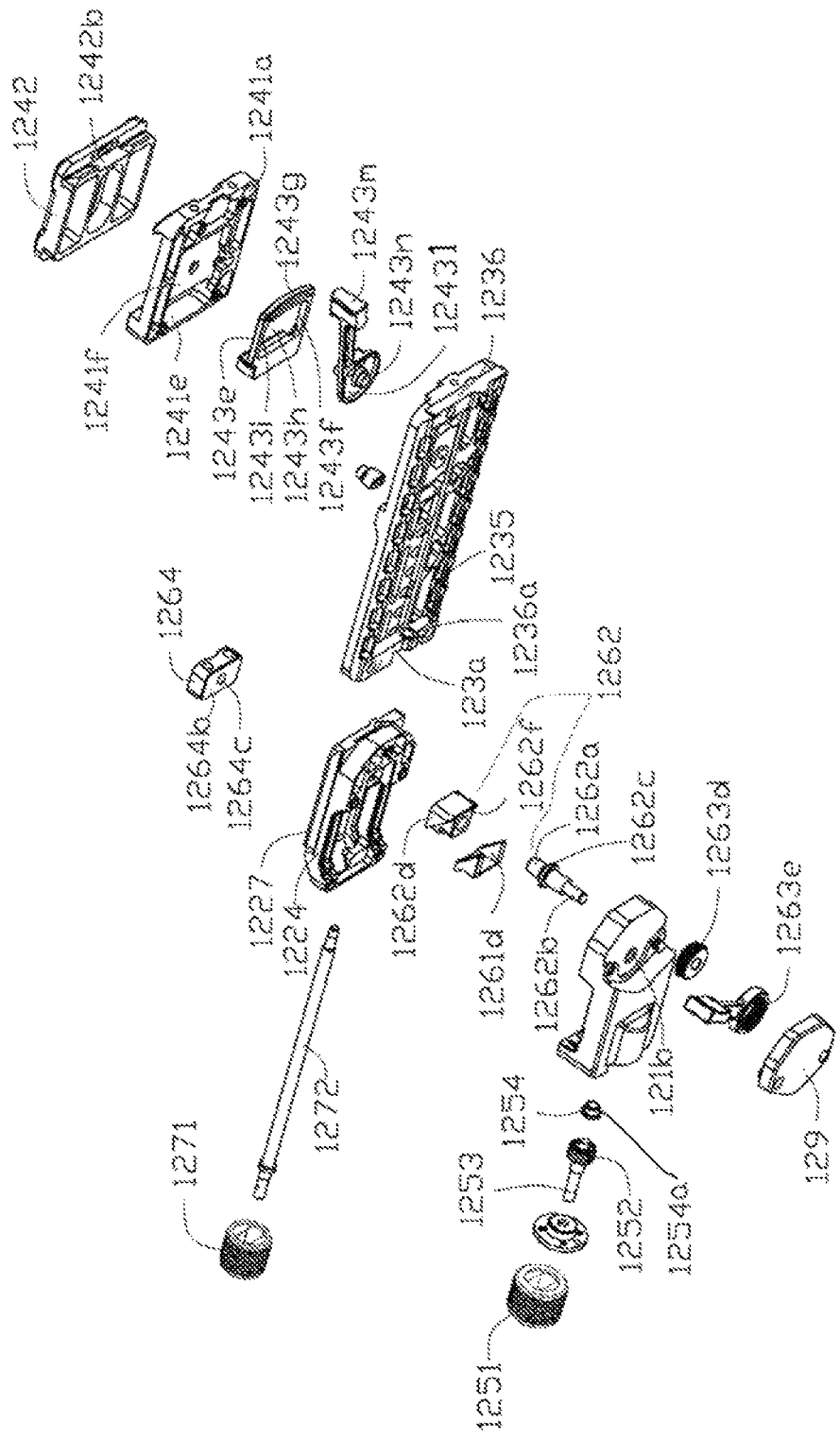
FIG. 5 is another perspective view of the mounting assembly of FIG. 4, according to an example embodiment.

Referring to FIG. 3-FIG. 5, in the embodiments shown in the figures, the first seating body 12a may be configured to sleeve-fit with the first horizontal frame 111. Specifically, the first seating body 12a may include a first joining member 121 and a second joining member 122. The first joining member 121 and the second joining member 122 may join together to form the first seating body 12a. The first joining member 121 may include a first groove 121a, the second joining member 122 may include a second groove 122a. When the first joining member 121 and the second joining member 122 are joined together, the first groove 121a and the second groove 122a together may form an entire through hole for the first horizontal frame 111 to penetrate through.

The first joining member 121 may include a first mounting member 1211 and a second mounting member 1212 connected with the first mounting member 1211. The first mounting member 1211 may be configured to mount the first adjusting member 12c. The second mounting member 1212 may be configured to mount the fastener 12d. In some embodiments, the first mounting member 1211 and the second mounting member 1212 may be integrally formed. The first mounting member 1211 may have a substantial "L" shape. The first mounting member 1211 and the second mounting member 1212 together may enclose to form the first groove 121a.

The first joining member 121 may be provided with a first through hole 1214 for the first adjusting member 12c to penetrate through and a first fitting groove 1215. The first through hole 1214 and the first fitting groove 1215 may be disposed inside the first mounting member 1211. The first through hole 1214 and the first fitting groove 1215 may be connected with one another. The first through hole 1214 may extend through a side surface of the first mounting member 1211 that faces away from the second mounting member 1212. The first fitting groove 1215 extends through a bottom surface of the first groove 121a. The first through hole 1214 allows the first adjusting member 12c to rotate relative to the first joining member 121. The first fitting groove 1215 is a substantially partially-cylindrical groove. The first fitting groove 1215 includes an opening formed at a bottom surface of the first groove 121a. The opening allows a portion of the structure of the first adjusting member 12c facing the first mounting member 1211 to protrude out of a surface of the first mounting member 1211, such that the first adjusting member 12c can couple with the guiding segment 1111 and drive the first seating body 12a to move in the first direction d1. It is understood that in other embodiments, the first fitting groove 1215 may include other shapes, as long as the shapes do not affect the first adjusting member 12c to drive the first seating body 12a to move.

The first joining member 121 may include a matching depression 1218. The matching depression 1218 may be located at an end of the first through hole 1214 facing against the first fitting groove 1215 and may be connected with the first through hole 1214. In some embodiments, the matching depression 1218 may depress from an outer side surface of the first mounting member 1211. The first through hole 1214 may extend from a bottom surface of the matching depression 1218 until to a location connected with the first fitting groove 1215. The matching depression 1218 may match with some structure of the first adjusting member 12c to improve the accuracy of mounting and operation.

The first joining member 121 may be provided with a second through hole 1216 configured to allow a fastener 12d to penetrate through and a second fitting groove 1217. The second through hole 1216 and the second fitting groove 1217 are provided within the second mounting member 1212. The second through hole 1216 is connected with the second fitting groove 1217. The second through hole 1216 extends throughout a side surface of the second mounting member 1212 that faces against the second joining member 122. In some embodiments, the extending direction of the second through hole 1216 is substantially perpendicular to the length direction of the guiding segment 1111. The second fitting groove 1217 extends throughout a side surface of the second mounting member 1212 facing the second joining member 122. In addition, the second fitting groove 1217 also extends throughout a side surface of the second mounting member 1212 facing the first mounting member 1211, and connects with the first groove 121a. The second through hole 1216 allows a portion of the structure of the fastener 12d to penetrate through and to rotate relative to the first joining member 121. The second fitting groove 1217 is a substantially rectangular groove. The second fitting groove 1217 allows a portion of the structure of the fastener 12d to protrude from the second mounting member 1212 toward the first groove 121a, such that the fastener 12d can tightly abut against the first horizontal frame 111, to lock a relative location of the first seating body 12a relative to the first horizontal frame 111. The second fitting groove 1217 also allows a portion of the structure of the fastener 12d to move closer to or away from the second joining member 122. In some embodiments, a cross-sectional area size of the second fitting groove 1217 is greater than a cross-sectional area size of the second through hole 1216, such that a portion of the structure of the fastener 12d can move in the second fitting groove 1217, but without exiting from the second through hole 1216.

It is understood that in other embodiments, the second fitting groove 1217 may have other shapes, as long as the above functions can be realized.

The second joining member 122 has a substantially rectangular block shape, including a top surface 1221, a bottom surface 1222, a first side surface 1223, a second side surface 1224, a first end surface 1225, and a second end surface 1226. The top surface 1221 and the bottom surface 1222 are disposed opposing one another, the first side surface 1223 and the second side surface 1224 are disposed opposing one another, the first end surface 1225 and the second end surface 1226 are disposed opposing one another. The bottom surface 1222 faces the first joining member 121. The top surface 1221 faces the second seating body 12b. The second groove 122a is formed by depressing from the bottom surface 1222 toward the top surface 1221.

The second joining member 122 also includes a receiving groove 122b. The receiving groove 122b is configured to receive a portion of the structure of the fastener 12d, and to allow the portion of the structure to slide relative to the second joining member 122 closer to or away from the second seating body 12b, such that the portion of the structure of the fastener 12d tightly abuts against the second seating body 12b to lock a relative location of the second seating body 12b relative to the first seating body 12a. In the embodiments shown in the figures, the receiving groove 122b has a substantially rectangular groove shape. The receiving groove 122b may be formed by depressing from the top surface 1221 of the second joining member 122 toward the bottom surface 1222. In some embodiments, the receiving groove 122b and the second groove 122a are disposed in a staggered manner in a direction substantially parallel with the top surface 1221, and are not connected with one another. More specifically, the second groove 122a may be disposed closer to the first end surface 1225, and the receiving groove 122b may be disposed closer to the second end surface 1226.

The second joining member 122 may be provided with a mounting hole 122c. The mounting hole 122c may penetrate from the first end surface 1225 through the second end surface 1226. In some embodiments, the mounting hole 122c is a threaded hole with internal threads. The extending direction of the mounting hole 122c is substantially parallel with the second direction d2.

The second joining member 122 may include a first guiding member 1227. The first guiding member 1127 may couple with the second seating body 12b to guide the second seating body 12b in a moving direction relative to the first seating body 12a. In some embodiments, the first guiding member 1227 includes two strip protrusions separately formed on the first side surface 1223 and the second side surface 1224. The two protrusions are disposed in parallel with one another and are substantially in parallel with the second direction. Each of the protrusions is a substantially wedge-shaped protrusion. The two protrusions form the substantially swallowtail-shaped first guiding member 1227. It is understood that in other embodiments, the shape and location of the first guiding member 1227 may be suitably changed based on specific needs. For example, the cross section of the protrusion on each side may be a half circle, an oval, a triangle, or a rectangle, etc. The protrusion on each side may include a plurality of non-continuous protrusions arranged in the second direction d2.

The second joining member 122 may include a protruding rib 1228. The protruding rib 1228 has a substantial long strip shape and protrudes from the top surface 1221 corresponding to the mounting hole 122c. On one hand, the protruding rib 1228 can increase the structural strength at the mounting hole 122c, avoiding damage at the mounting hole 122c due to an excessive force experienced by the second joining member 122. One the other hand, the protruding rib 1228 may couple with the second seating body 12b and function as a guiding structure for the movement of the second seating body 12*b* relative to the first seating body 12*a*, thereby forming an auxiliary guiding member besides the first guiding member 1227.

The second seating body 12*b* may be configured to mount the load 20, and can cause the load 20 to move relative to the first seating body 12*a* in the second direction. In the embodiments shown in the figures, the second seating body 12*b* includes a movable member 123 and a connecting member 124. The movable member 123 is configured to movably connect with the first seating body 12*a* to adjust the mounting location of the load 20. The connecting member 124 may connect the load to the second seating body 12*b*.

The movable member 123 may have a substantial long strip shape, including a top surface 1231, a bottom surface 1232 opposing the top surface 1231, a first end surface 1233, and a second end surface 1234 opposing the first end surface 1233. The bottom surface 1232 faces the first seating body 12*a*. The facing direction of the first end surface 1233 is the same as the facing direction of the first end surface 1225 of the second joining member 122. The facing direction of the second end surface 1234 is the same as the facing direction of the second end surface 1226 of the second joining member 122. The top surface 1231 may be configured to connect and mount the connecting member 124. The movable member 123 may include a second guiding member 1235 corresponding to the first guiding member 1227. The second guiding member 1235 may be configured to couple with the first guiding member 1227 to guide the movable direction of the first seating body 12*a* relative to the second seating body 12*b*. In some embodiments, the second guiding member 1235 may include two guiding grooves formed in the movable member 123. Specifically, a depressed opening 123*a* may be formed at the bottom surface 1232 of the movable member 123. The depressed opening 123*a* may be a substantially rectangular groove. The guiding grooves may be long strip shaped grooves formed on opposing inner surfaces of the depressed opening 123*a*, respectively. Each of the guiding grooves has a substantially wedge-shaped groove shape. The two guiding grooves form the substantially swallowtail groove shaped second guiding member 1235. It is understood that the shape and location of the second guiding member 1235 may be suitably changed based on specific needs. For example, corresponding to different disposition locations and cross section area shapes of the first guiding member 1227, the disposition locations and the cross section area shapes of the second guiding member 1235 may be different.

The movable member 123 may include two load bearing members 1236 disposed opposing each other. The load bearing members 1236 may be configured to bear the second adjusting member 12*e* and allow the second adjusting member 12*e* to rotate relative to the second seating body 12*b*. In some embodiments, the load bearing members 1236 may be disposed at the bottom of the movable member 123 close to the first end surface 1233 and the second end surface 1234, respectively. Specifically, the load bearing members 1236 may be protrusions relative to a bottom surface of the depressed opening 123*a*. The load bearing members 1236 may be substantially parallel with the bottom surface 1232.

Each of the load bearing members 1236 may be provided with an axis hole 1236*a*. The axis hole 1236*a* may be configured to rotatably couple with the second adjusting member 12*e*, and at least one axis hole 1236*a* may be configured to limit the movement of the second adjusting member 12*e* in the second direction d2. In some embodiments, the axis hole 1236*a* closer to the first end surface 1233 may be a through hole, and the axis hole 1236*a* closer to the second end surface 1234 may be a blocked hole.

It is understood that the load bearing members 1236 and the movable member 123 may be integrally formed, or may be separately formed and then connected through a connecting member.

The movable member 123 may include a first mounting structure 1237 and a second mounting structure 1238 formed at the top surface 1231. The first mounting structure 1237 may be disposed close to the first end surface 1233. The second mounting structure 1238 may be disposed close to the second end surface 1234. The first mounting structure 1237 may be configured to mount a counterweight assembly 40 (shown in FIG. 1). In some embodiments, the first mounting structure 1237 may be a strip-shaped protruding block having multiple connecting holes 1237*a*. The multiple connecting holes 1237*a* may be arranged in a direction substantially parallel with the second direction d2. The connecting holes 1237*a* may locate and fix the mounting location of the counterweight assembly 40. The counterweight assembly 40 may be selectively connected with any of the connecting holes 1237*a*, such that the counterweight assembly 40 may match with different load 20 to realize an equilibrium in the center of gravity. In some embodiments, the connecting holes 1237*a* may be threaded holes.

The second mounting structure 1238 may be configured to mount the connecting member 124. In the embodiments shown in the figures, the second mounting structure 1238 may include a first assembly hole 1238*a* and a shaft connecting hole 1238*b*. The first assembly hole 1238*a* may be configured to fixedly connect a portion of the structure of the connecting member 124. The shaft connecting hole 1238*b* may be configured to rotatably connect the portion of structure of the connecting member 124. In some embodiments, the first assembly hole 1238*a* may be a threated hole. The shaft connecting hole 1238*b* may be located at a bottom of a groove 1238*c* having a side-facing opening, which is located on the top surface 1231. The groove 1238*c* may be configured to partially receive the rotating structure of the connecting member 124. The side-facing opening allows the rotating structure of the connecting member 124 to rotate for a predetermined angle. The second mounting structure 1238 may include a fixing hole 1238*d* located at the top surface 1231 and a positioning pin 1238*e*. The fixing hole 1238*d* is biasedly disposed from the shaft connecting hole 1238*b* on the side of the groove 1238*c*. The positioning pin 1238*e* may be fixedly received in the fixing hole 1238*d*, with a portion extending out of the fixing hole 1238*d*. The positioning pin 1238*e* may be configured to locate the mounting location of the connecting member 124 on the movable member 123, and may prevent reversed mounting of the connecting member 124.

The connecting member 124 may include a fixing member 1241, a slidable member 1242, and a locking member 1243. The fixing member 1241 may be fixedly connected with the movable member 123. The slidable member 1242 may be configured to slidably connect the fixing member 1241. The locking member 1243 may be disposed at the fixing member 1241 and may move relative to the fixing member 1241 to lock the slidable member 1242 or release the locking of the slidable member 1242.

The fixing member 1241 may have a substantially rectangular shape. The fixing member 1241 may include a second assembly hole 1241*a* corresponding to the first assembly hole 1238*a*. When the fixing member 1241 is mounted to the movable member 123, the second assembly hole 1241*a* is aligned with the corresponding first assembly hole 1238a, respectively. The fixing member 1241 may include a positioning hole 121b corresponding to the positioning pin 1238e. The positioning hole 1241b may couple with the positioning pin 1238e to locate the mounting location of the fixing member 1241.

The fixing member 1241 may include a guiding block 1241c and a blocking member 1241d. The guiding block 1241c and the blocking member 1241d may be disposed protruding from a side surface of the fixing member 1241 facing away from the movable member 123. The guiding block 1241c and the blocking member 1241d may have a substantial long strip shape, and the length directions may be substantially parallel with the first direction d1. The end of the guiding block 1241c facing away from the fixing member 1241 slantly and inwardly extends to form a snap-in member 1241g. The snap-in member 1241g may snap into the slidable member 1242 and guide the sliding direction of the slidable member 1242. In some embodiments, the guiding block 1241c includes two separately disposed protruding blocks. It is understood that the guiding block 1241c may be an integral protruding block.

The blocking member 1241d may be configured to abut and block the locking member 1243, such that the locking member 1243 may couple with the slidable member 1242. The fixing member 1241 may include a through hole 1241e at a location near the blocking member 1241d. The through hole 1241e allows a portion of the structure of the locking member 1243 to penetrate through and to couple with the slidable member 1242. In some embodiments, the through hole 1241e may be a rectangular hole, with a length direction substantially parallel with the first direction d1, and a width direction substantially perpendicular to the first direction d1.

The fixing member 1241 may include a receiving depression 1241f on a surface facing the movable member 123. The receiving depression 1241f and the through hole 1241e, the fixing member 1241 may be connected with the movable member 123, and the receiving depression 1241f may receive a portion of the structure of the slidable member 1242 to allow the slidable member 1242 to slide in the receiving depression 1241f. In some embodiments, the receiving depression 1241f may have a substantially rectangular groove shape. It is understood that the receiving depression 1241f may include other shapes, as long as the above functions can be realized, which is not limited by the present disclosure.

The slidable member 1242 may be configured to connect with the load 20 and to adjust the mounting location of the load 20 on the mounting assembly 12. In some embodiments, the slidable member 1242 may have a substantially cubic shape. The slidable member 1242 may include two snap-fit grooves 1242a. The snap-fit grooves 1242a may be disposed on two side surfaces of the slidable member 1242 that face against one another, respectively. Each of the snap-fit grooves 1242a may have a substantial long strip shape. The length direction of the snap-fit groove 1242a may be substantially parallel with the first direction d1. In some embodiments, the two snap-fit grooves 1242a may substantially form a structure having a swallowtail groove shape. The slidable member 1242 may be provided with a connecting structure 1242b configured to connect and mount the load 20. In some embodiments, the connecting structure 1242b may be a groove formed in a side surface of the slidable member 1242 that faces against the fixing member 1241. The connecting structure 1242b may be a groove having a substantial waist shape.

The locking member 1243 may include a slidable part 1243a and a driving member 1243b configured to drive the slidable part 1243a to move. The slidable part 1243a may include a bottom plate 1243c and a locking block 1243d protruding from the bottom plate 1243c. The locking block 1243d protrudes from a side surface of the bottom plate 1243c that faces against the movable member 123 and is disposed at a side closer to the bottom plate 1243c. That is, the slidable part 1243a and the bottom plate 1243c may be connected with one another in a substantial "L" shape. The slidable part 1243a may be configured to couple with the receiving depression 1241f and may slide in the receiving depression 1241f. In some embodiments, the slidable part 1243a may have a substantial square frame shape, including a first side edge 1243e, a second side edge 1243f, and an end wall 1243g. The first side edge 1243e, the second side edge 1243f, the end wall 1243g and the locking block 1243d surroundingly form an opening 1243h. The end wall 1243g may be disposed opposing the locking block 1243d. The first side edge 1243e and the second side edge 1243f may be opposingly disposed and may be substantially in parallel with one another. An end of the locking block 1243d facing against the bottom plate slantly and inwardly extends to form a snap-in member 1243i. The snap-in member 1243i may be configured to match with the one of the snap-fit grooves 1242a. A side surface of the locking block 1243d facing the blocking member 1241d is formed with an abutting depression 1243j. The abutting depression 1243j may be configured to abut an elastic member (not shown) against and between the locking member 1243 and the fixing member 1241.

The driving member 1243b may include a rotating disk 1243k, a protruding wheel 12431, and an operating member 1243m. The protruding wheel 12431 may be located at a side surface of the rotating disk 1243k facing against the movable member 123. The operating member 1243m may be configured to connect to the outer circumference surface of the rotating disk 1243k and extend in a direction away from the center of the rotating disk 1243k for a predetermined distance. A rotating shaft 1243n is formed at the center of the rotating disk 1243k. The rotating shaft 1243n protrudes from a side surface of the rotating disk 1243k facing the movable member 123, and may rotatably couple with the shaft connecting hole 1238b. It is understood that in other embodiments, the rotating disk 1243k may be omitted. Instead, the protruding wheel 12431 and the operating member 1243m may be directly connected with the rotating shaft 1243n.

The first adjusting member 12c may be configured to drive the first seating body 12a to move relative to the first horizontal frame 111, to adjust the mounting location of the first seating body 12a relative to the first horizontal frame 111. In some embodiments, the first adjusting member 12c may include a first knob 1251 and a first driving member 1252. The first knob 1251 may be configured to drive the first driving member 1252 to rotate. The first driving member 1252 may be configured to fixedly connect with a rotating shaft 1253. Two ends of the rotating shaft 1253 may protrude from two sides of the first driving member 1252. The first knob 1251 may be configured to sleeve-fit onto the rotating shaft 1253 and may form a stop-rotation connection with the rotating shaft 1253. Specifically, an end of the rotating shaft 1253 facing the first knob 1251 may be provided with a pin hole 1253a, the rotating shaft 1253 and the first knob 1251 may be coupled with one another through a pin (not shown) to form a stop-rotation connection. It is understood that the rotating shaft 1253 and the first knob 1251 may form a stop-rotation connection through shape matching. For example, an end of the rotating shaft 1253 facing the first driving member 1252 may be a polygon prism, and the first knob 1251 may be provided with a polygon insertion hole that matches with the polygon prism. In other embodiments, the rotating shaft 1253 may have other shapes, such as oval, plum blossom shape, Chinese character "−" shape, Chinese character "+" shape, or other regular or irregular shapes. In some embodiments, the first driving member 1252 may include a gear, which may mesh with the tooth strip 1114 of the first horizontal frame 111. In some embodiments, the first driving member 1252 may include a helical gear, i.e., a gear whose length direction of the tooth slants at a predetermined angle relative to a rotating axis of the gear. The first driving member 1252 may mesh with the slanted teeth of the tooth strip 1114 through the helical gear structure, which may increase the meshing area, reduce the engaging gap, and increase the stability and reliability of the transmission.

The first adjusting member 12c may also include a bearing 1254. The bearing 1254 may include a shaft hole 1254a. The shaft hole 1254a may rotatably couple with the rotating shaft 1253. The first adjusting member 12c may be configured to fixedly connect with the first joining member 121. The bearing 1254 may fixedly connect with the first joining member 121 through a threaded connection, gluing, welding, or snap-fitting. In some embodiments, the first bearing 1254 may fixedly connect with a side inner wall of the first fitting groove 1215 facing the first adjusting member 12c.

It is understood that in other embodiments, the bearing 1254 may be integrally formed with the second joining member 122. Alternatively, the bearing 1254 may be omitted, and a shaft hole may be provided directly at the second joining member 122.

The fastener 12d may be configured to lock the first seating body 12a at the first horizontal frame 111, such that the location of the first seating body 12a relative to the first horizontal frame 111 is locked, and the location of the second seating body 12b relative to the first seating body 12a is locked. The fastener 12d may include a first abutting member 1261, a second abutting member 1264, a driving member 1262, and a handle 1263. The first abutting member 1261 may be driven by the driving member 1262 to tightly abut against the first horizontal frame 111. The second abutting member 1264 may be driven by the driving member 1261 to tightly abut against the second seating body 12b. The handle 1263 may allow a user to operate the driving member 1262 to drive the first abutting member 1261 and the second abutting member 1264 to move. The first abutting member 1261 may have a substantially triangular prism shape, and may include a first abutting surface 1261a, a first slant surface 1261b, and a bottom surface 1261c. The shape of the first abutting surface 1261a may match with the shape of the side surface of the first horizontal frame 111 to increase the abutting contact area with the first horizontal frame 111, thereby increasing the stability of the fixed connection. The first slant surface 1261b may slidably couple with the driving member 1262. The first abutting member 1261 may be provided with an avoidance member 1261d. In some embodiments, the avoidance member 1261d may extend throughout the first slant surface 1261b and the bottom surface 1261c. The avoidance member 1261d may enable the first abutting member 1261 to engage with the driving member 1262 and to move toward the first horizontal frame 111.

In some embodiments, the second abutting member 1264 may have a substantially cuboidal shape, including the second abutting surface 1264a facing the second seating body 12b and a fitting surface 1264b that faces against the second abutting surface 1264a. The second abutting surface 1264a may tightly abut against the second seating body 12b. The fitting surface 1264b may include a fitting hole 1264c configured to couple with the driving member 1262. In some embodiments, the fitting hole 1264c may couple with the driving member 1262 and may be driven by the driving member 1262 to tightly abut against the second seating body 12b.

In some embodiments, the driving member 1262 may include a stud segment 1262a, a connecting segment 1262b, an abutting-pressing member 1262c located between the stud segment 1262a and the connecting segment 1262b, and a pressing block 1262d. The stud segment 1262a may include external threads configured to engage with the internal threads of the fitting hole 1264c. The engagement between the stud segment 1262a and the fitting hole 1264c may enable the stud segment 1262a to drive, when rotating, the first abutting member 1261 to move. The connecting segment 1262b may penetrate through the pressing block 1262d to form a stop-rotation connection with the handle 1263. The details of the stop-rotation connection may refer to the previous descriptions relating to the stop-rotation connection in the first adjusting member 12c, which are not repeated.

The abutting-pressing member 1262c may protrude from a circumferential side surface of the stud segment 1262a, forming a substantially ring-shaped protruding edge. When the stud segment 1262a penetrates through the pressing block 1262d, the abutting-pressing member 1262c may abut against the pressing block 1262d.

The pressing block 1262d may be configured to drive the first abutting member 1261 to tightly abut against the first horizontal frame 111. In the embodiments shown in the figures, the pressing block 1262d may have a substantially cubic shape. The pressing block 1262d may include a first surface 1262e, a second surface 1262f facing against the first surface 1262e, and a second slant surface 1262g fitting with the first slant surface 1261b. The first surface 1262e may face the second seating body 12b. The second slant surface 1262g may face the first abutting member 1261 and may form a predetermined slant angle with the first surface 1262e and the second surface 1262f.

The first surface 1262e of the pressing block 1262d may include a depression 1262h. The size of the depression 1262h may be greater than the size of the abutting-pressing member 1262c. The pressing block 1262d may include a through hole 1262i. The through hole 1262i may extend from the bottom of the depression 1262h to the second surface 1262f. The through hole 1262i may allow the connecting segment 1262b to penetrate through and may be rotatably coupled with the connecting segment 1262b. The size of an opening of the connecting segment 1262b at the bottom surface of the depression 1262h may be smaller than the size of the abutting-pressing member 1262c. It is understood that in other embodiments, the depression 1262h may be omitted. The through hole 1262i may extend from the first surface 1262e to the second surface 1262f.

In the embodiments shown in the figures, the second slant surface 1262g may be formed by cutting two side surfaces of the pressing block 1262d that face against one another. As such, the second slant surface 1262g may include two slant surfaces of two sides of the pressing block 1262d that face against one another. In other embodiments, the second slant surface 1262g may be formed by protrusions that protrude from two side surfaces of the pressing block 1262d that face against one another.

The handle 1263 may form a stop-rotation connection with the connecting segment 1262b. The handle 1263 may allow a user to operate, such that the driving member 1262 can rotate to drive the first abutting member 1261 to move. Specifically, the handle 1263 may include a cap member 1263c, a sleeve-fitting member 1263a, and a handle member 1263b connected with the sleeve-fitting member 1263a. The cap member 1263c may form a stop-rotation connection with the connecting segment 1262b. The stop-rotation connection may refer to the stop-rotation connection described previously, which is not repeated. The external circumferential surface of the cap member 1263c may form a protruding rib 1263d. Specifically, the protruding rib 1263d may include multiple strip-shaped ribs. The length direction of the protruding rib 1263d may be substantially parallel with a central axis of the cap member 1263c. The sleeve-fitting member 1263a may have a substantial ring shape. The inner surface of the sleeve-fitting member 1263a may include a groove 1263e corresponding to the protruding rib 1263d. When the sleeve-fitting member 1263a sleeve-fits onto the cap member 1263c, the groove 1263e may couple with the protruding rib 1263d such that the handle member 1263b and the cap member 1263c form a stop-rotation connection. It is understood that the sleeve-fitting member 1263a and the cap member 1263c may form the stop-rotation connection through coupling using other shapes, such as oval, plum blossom shape, Chinese character "−" shape, Chinese character "+" shape, or other regular or irregular shapes. In addition, the sleeve-fitting member 1263a and the cap member 1263c may form the stop-rotation connection through a stop-rotation pin that penetrates through the sleeve-fitting member 1263a and the cap member 1263c. Alternatively, the sleeve-fitting member 1263a and the cap member 1263c may be integrally formed.

The handle member 1263b may extend for a predetermined distance toward an outer side of the sleeve-fitting member 1263a, which makes it more labor-saving when operating the handle 1263.

In some embodiments, the first seating body 12a may include a blocking cover 129. The blocking cover 129 may prevent the handle 1263 from falling off from the driving member 1262. The blocking cover 129 may have a substantial disk shape that has an internal depression. The blocking cover 129 may cover the first seating body 12a and may form a gap with the first seating body 12a, such that the handle member 1263b may extend out of the blocking cover 129, which makes the operation convenient. Specifically, the blocking cover 129 may cover the first joining member 121 and form a gap with the first joining member 121.

The second adjusting member 12e may drive the second seating body 12b to move relative to the first seating body 12a, to adjust the mounting location of the second seating body 12b relative to the first seating body 12a. In some embodiments, the second adjusting member 12e may include a second knob 1271 and a second driving member 1272. The second knob 1271 may drive the second driving member 1272 to rotate. Specifically, the second driving member 1272 may be a lead screw having external threads. The external threads of the second driving member 1272 may engage with the internal threads of the mounting hole 122c. The second driving member 1272 may include a first connecting end 1272a and a second connecting end 1272b facing against the first connecting end 1272a. The first connecting end 1272a and the second connecting end 1272b may rotatably connect the second driving member 1272 with the second seating body 12b. The second knob 1271 may form a stop-rotation connection with the second connecting end 1272b. The stop-rotation connection may refer to the above stop-rotation connection structure described previously, which is not repeated.

Next, the assembly relationship of the imaging device 100 will be introduced with reference to FIG. 1 to FIG. 5.

The first adjusting member 12c and the fastener 12d are coupled with one another. Specifically, an end of the rotating shaft 1253 may penetrate the first through hole 1214. The bearing 1254 may be fixed at the first joining member 121. The first driving member 1252 may be located in the first fitting groove 1215. A portion of the first driving member 1252 may protrude from a bottom surface of the first groove 121a. The first knob 1251 may be connected with an end of the rotating shaft 1253 penetrating through the first through hole 1214. The first knob 1251 may form a stop-rotation connection with the rotating shaft 1253.

The first abutting member 1261 and the pressing block 1262d may be disposed in the second fitting groove 1217. The first slant surface 1261b and the second slant surface 1262g may fit with one another. The second abutting member 1264 may be received in the receiving groove 122b. The connecting segment 1262b may penetrate through the through hole 1262i of the pressing block and the second through hole 1216 of the first seating body 12a in sequence to form a stop-rotation connection with the handle 1263. The stud segment 1262a may be connected with the fitting hole 1264c of the second abutting member 1264. The blocking cover 129 may cover the handle 1263 and connect with the first seating body 12a.

The first joining member 121 and the second joining member 122 may be joined from two sides of the first horizontal frame 111. The joined first joining member 121 and second joining member 122 may be sleeve-fit on the first horizontal frame 111. The first driving member 1252 may mesh with the tooth strip of the guiding segment 1111. The first joining member 121 and the second joining member 122 may be joined together through bolts, gluing parts, or snap-fitting parts, etc.

The connecting member 124 of the second seating body 12b may be mounted to the movable member 123. Specifically, the rotating shaft 1243n of the driving member 1243b of the locking member 1243 may be inserted into the shaft connecting hole 1238b. The rotating disk 1243k may be received in the groove 1238c. The operating member 1243m may extend out of the second seating body 12b from an opening on a side of the groove 1238c. The bottom plate of the slidable part 1243a may be received in the receiving depression 1241f. The locking block 1243d may penetrate through the through hole 1241e and protrude from a side surface of the fixing member 1241 that faces the slidable member 1242. The positioning pin 1238e may be fixedly received in the fixing hole 1238d, with a portion of the positioning pin 1238e extending out of the fixing hole 1238d. The fixing member 1241 may be fixed to the movable member 123. An end of the positioning pin 1238e may insert into the positioning hole 1241b. Specifically, the fixing member 1241 may be fixed to the movable member 123 through a fastener (not shown) that penetrates through the first assembly hole 1238a and a corresponding second assembly hole 1241a.

The slidable member 1242 may be slidably connected with the fixing member 1241. The snap-in member 1241g of the slidable member 1242 and the snap-in member 1243*i* of the locking member 1243 may respectively snap into the snap-fit groove 1242*a*.

The first seating body 12*a* and the second seating body 12*b* may be slidably connected. Specifically, the second joining member 122 may be assembled into the depressed opening 123*a* of the movable member 123. The first guiding member 1227 may respectively snap-fit with the second guiding member 1235, such that the second seating body 12*b* may slide relative to the first seating body 12*a*. The second driving member 1272 of the second adjusting member 12*e* may penetrate through the mounting hole 122*c*. The first connecting end 1272*a* and the second connecting end 1272*b* may respectively rotatably connect with the load bearing member 1236. The second knob 1271 and the second connecting end 1272*b* may form a stop-rotation connection. In some embodiments, after being assembled, the first knob 1251 and the second knob 1271 are located on a same side of the mounting assembly 12. That is, the operating parts of the first adjusting member 12*c* and the second adjusting member 12*e* that are operated by a user may be located on the same side of the mounting assembly 12, which makes adjusting the operations convenient.

The load 20 may be fixedly mounted to the slidable member 1242. The load 20 may adjust the mounting location relative to the second seating body 12*b* through the slidable member 1242. After the mounting location of the load 20 is adjusted, the driving member 1243*b* may be rotated. The protruding wheel 12431 may abut against the end wall 1243*g* of the bottom plate 1243*c* and drive the bottom plate 1243*c* to slide relative to the slidable part 1243*a*. The locking block 1243*d*, driven by the bottom plate 1243*c*, may move toward the guiding block 1241*c* of the fixing member 1241, and tightly clamp the slidable member 1242 together with the guiding block 1241*c*, to fix the mounting location of the slidable member 1242 relative to the fixing member 1241, and to simultaneously fix the mounting location of the load 20 relative to the second seating body 12*b*.

The imaging device 100, before being used, may adjust the location of the load 20 in the first direction d1 through the first adjusting member 12*c*, and adjust the location of the load 20 in the second direction d2 through the second adjusting member 12*e*, such that the center of gravity of the load 20 falls on the rotating axis of the gimbal 10. This may avoid the effect of an unexpected torque on the motor of the gimbal, maintain the operational life time of the gimbal, and improve the imaging user experience. After adjusting the load 20 in the first direction d1 and the second direction d2 to the desired locations, the fastener 12*d* may be operated, such that the first abutting member 1261 may fittingly and tightly abut against a side surface of the guiding segment 1111, to fix the relative locations of the first seating body 12*a* and the first horizontal frame 111. The second abutting member 1264 may tightly abut against the second seating body 12*b* to fix the relative locations of the second seating body 12*b* and the first seating body 12*a*.

The fastener 12*d* may lock the first seating body 12*a* and the second seating body 12*b* through the following detailed manner: when rotating the connecting segment 1262*b* in a predetermined direction through the handle 1263, the stud segment 1262*a* may drive, through threads transmission, the second abutting member 1264 to move toward the second seating body 12*b* to tightly abut against the second seating body 12*b*. After the second abutting member 1264 tightly abuts against the second seating body 12*b*, the connecting segment 1262*b* may move away from the second seating body 12*b* through transmission using the threads. The abutting-pressing member 1262*c* may abut against the pressing block 1262*d* to move away from the second seating body 12*b*. During the movement, the pressing block 1262*d* may couple with a slant surface of the first abutting member 1261 to drive the first abutting member 1261 to tightly abut against the first horizontal frame 111. By operating only one fastener 12*d*, the relative locations of the first seating body 12*a* and the first horizontal frame 111 and the relative locations of the second seating body 12*b* and the first seating body 12*a* may be simultaneously locked. IN some embodiments, a direction in which the driving member 1262 drives the first abutting member 1261 and a direction in which the driving member 1262 drives the second abutting member 1264 are substantially perpendicular to one another. It is understood that the direction in which the driving member 1262 drives the first abutting member 1261 and the direction in which the driving member 1262 drives the second abutting member 1264 may form another angle, which is not repeated one by one.

In the embodiments shown in the figures, the first adjusting member 12*c* may be provided on the first seating body 12*a*, and may mesh with the tooth strip 1114 provided on the first horizontal frame 111 to drive the first seating body 12*a* to move. It is understood that the first adjusting member 12*c* may also be provided on the first horizontal frame 111, and the tooth strip 1114 may be provided on the first seating body 12*a*.

It is understood that the structure of the first guiding member 1227 and the structure of the second guiding member 1235 may be exchanged. That is, the second seating body 12*b* may form a structure similar to the structure of the first guiding member 1227, and the first seating body 12*a* may form a structure similar to the structure of the second guiding member 1235.

It is understood that a person having ordinary skills in the art can make modifications to be used in the design of the present disclosure within the spirit of the present disclosure, as long as the modifications do not deviate from the technical effect of the present disclosure. Such modifications made according to the spirit of the present disclosure are all included in the scope of protection of the present disclosure.

What is claimed is:

1. A gimbal load mounting assembly, comprising:
   a first seating body;
   a second seating body configured to slidably connect with the first seating body; and
   a fastener,
   wherein the first seating body is configured to connect with a gimbal frame and slide in a first direction, the second seating body is configured to mount a load and is slidable on the first seating body in a second direction, and the fastener is configured to connect with the first seating body and to lock a mounting location of the first seating body relative to the gimbal frame and a mounting location of the second seating body relative to the first seating body.

2. The gimbal load mounting assembly of claim 1,
   wherein the fastener comprises a first abutting member, a second abutting member, and a driving member,
   wherein the first abutting member and the second abutting member are movably provided at the first seating body, and
   wherein the driving member is configured to abut against the first abutting member and the second abutting member, to drive the first abutting member to abut against the gimbal frame and drive the second abutting member to abut against the second seating body, and to lock the mounting location of the first seating body relative to the gimbal frame and the mounting location of the second seating body relative to the first seating body.

3. The gimbal load mounting assembly of claim 2, wherein the driving member is configured to drive the first abutting member and the second abutting member in different directions.

4. The gimbal load mounting assembly of claim 3, wherein a direction in which the driving member drives the first abutting member is substantially perpendicular to a direction in which the driving member drives the second abutting member.

5. The gimbal load mounting assembly of claim 2,
  wherein the first seating body comprises a fitting groove and a receiving groove,
  wherein the fitting groove comprises an opening facing the gimbal support, and the receiving groove comprises an opening facing the second seating body,
  wherein the first abutting member is configured to be movably received in the fitting groove, the second abutting member is configured to be movably received in the receiving groove, and
  wherein the driving member is configured to drive the first abutting member to extend out of the opening of the fitting groove to cause the first abutting member to abut against the gimbal frame, and to drive the second abutting member to extend out of the opening of the receiving groove to cause the second abutting member to abut against the second seating body.

6. The gimbal load mounting assembly of claim 5,
  wherein the driving member comprises a stud segment, a connecting segment fixedly connected with the stud segment, an abutting-pressing member located between the stud segment and the connecting segment, and a pressing block,
  wherein the stud segment is configured to connect with the second abutting member through threads and to drive the second abutting member to move through a thread transmission manner, and
  wherein the connecting segment is configured to rotatably penetrate through the pressing block to cause the abutting-pressing member to abut and press against the pressing block, the pressing block to abut against the first abutting member, and the abutting-pressing member to press the pressing block to move through a counteraction transmitted by the threads to drive the first abutting member to move.

7. The gimbal load mounting assembly of claim 6,
  wherein the first abutting member comprises an avoidance member, the avoidance member penetrating through the first slant surface, and
  wherein the avoidance member is configured to enable the first abutting member to avoid the connecting segment and to couple with the pressing block.

8. The gimbal load mounting assembly of claim 6,
  wherein the pressing block comprises a depression and a through hole, the depression is located on a side surface of the pressing block facing the second abutting member, the through hole penetrates from a bottom of the depression throughout a side surface of the pressing block facing the second abutting member,
  wherein the connecting segment is configured to rotatably penetrate through the through hole, and
  wherein the abutting-pressing member is configured to abut and press the bottom of the depression.

9. The gimbal load mounting assembly of claim 1, wherein the first seating body comprises a first guiding member, the second seating body comprises a second guiding member corresponding to the first guiding member, the first seating body and the second seating body are configured to slidably connect with one another through the first guiding member and the second guiding member.

10. The gimbal load mounting assembly of claim 9, wherein the first guiding member is formed by strip-shaped protrusions on two side surfaces of the first seating body that face against one another, the second guiding member is formed by strip-shape grooves formed on two inner wall of the second seating body that face against one another.

11. The gimbal load mounting assembly of claim 10, wherein the second guiding member is a swallowtail-shaped groove.

12. The gimbal load mounting assembly of claim 1, wherein the second seating body comprises a movable member and a connecting member, the movable member is configured to slidably connect with the first seating body, the connecting member is configured to connect with the movable member for mounting the load.

13. The gimbal load mounting assembly of claim 12, wherein the movable member comprises a first mounting structure and a second mounting structure, the first mounting structure is configured to mount a counterweight assembly, the connecting member is configured to connect to the movable member through the second mounting structure.

14. The gimbal load mounting assembly of claim 12,
  wherein the connecting member comprises a fixing member, a slidable member, and a locking member, the fixing member is configured to fixedly connect with the movable member, the slidable member is configured to slidably connect with the fixing member, the locking member is provided at the fixing member and is configured to move relative to the fixing member to lock the slidable member or release the locking of the slidable member.

15. The gimbal load mounting assembly of claim 1, further comprising a first adjusting member, wherein the first adjusting member is disposed on one of the first seating body and the gimbal frame and is configured to drive another one of the first seating body and the gimbal frame to move, to adjust a relative location of the first seating body relative to the gimbal frame.

16. The gimbal load mounting assembly of claim 15, wherein the first adjusting member includes a gear configured to drive the one of the first seating body and the gimbal frame to move.

17. The gimbal load mounting assembly of claim 15, further comprising a second adjusting member, wherein the second adjusting member is configured to connect with the first seating body and the second seating body and to drive the second seating body to move relative to the first seating body.

18. A gimbal, comprising:
  a frame;
  a motor assembly configured to drive the frame to rotate; and
  a gimbal load mounting assembly provided on the frame, the gimbal load mounting assembly comprising:
    a first seating body;
    a second seating body configured to slidably connect with the first seating body; and
    a fastener,
    wherein the first seating body is configured to connect with a gimbal frame and slide in a first direction, the second seating body is configured to mount a load and is slidable on the first seating body in a second direction, and the fastener is configured to connect with the first seating body and to lock a mounting location of the first seating body relative to the gimbal frame and a mounting location of the second seating body relative to the first seating body.

19. The gimbal of claim 18, wherein the first direction is parallel with a pitch axis of the gimbal, and/or, the second direction is parallel with a roll axis of the gimbal.

20. An imaging device, comprising:
a gimbal; and
an imaging assembly mounted to the gimbal,
wherein the gimbal comprises a frame and a gimbal load mounting assembly, the gimbal load mounting assembly comprises:
a first seating body;
a second seating body configured to slidably connect with the first seating body; and
a fastener,
wherein the first seating body is configured to connect with a gimbal frame and slide in a first direction, the second seating body is configured to mount a load and is slidable on the first seating body in a second direction, and the fastener is configured to connect with the first seating body and to lock a mounting location of the first seating body relative to the gimbal frame and a mounting location of the second seating body relative to the first seating body.

\* \* \* \* \*